United States Patent [19]

Rygajlo

[11] 4,284,293
[45] Aug. 18, 1981

[54] ADJUSTABLE STAND

[75] Inventor: Izydor Rygajlo, Prior Lake, Minn.

[73] Assignee: Delmer M. Stamness, New Prague, Minn.

[21] Appl. No.: 143,740

[22] Filed: Apr. 25, 1980

[51] Int. Cl.³ .............................................. B66F 3/08
[52] U.S. Cl. ................................ 280/766; 248/354 S
[58] Field of Search .................. 248/357, 354 S, 352, 248/356; 280/763, 766

[56] References Cited

U.S. PATENT DOCUMENTS

| 969,851 | 9/1910 | Eickershoff | 248/356 |
|---|---|---|---|
| 985,921 | 3/1911 | Mounier | 254/108 |
| 1,765,200 | 6/1930 | Bullough | 248/356 |
| 1,807,914 | 6/1931 | Hopkins | 254/98 |
| 1,847,842 | 3/1932 | McCauley, Jr. et al. | 405/282 |
| 2,158,018 | 5/1939 | Wittman et al. | 248/354 S |
| 2,510,688 | 6/1950 | Evans et al. | 248/354 R |
| 2,885,181 | 5/1959 | McCully et al. | 248/357 X |
| 2,970,810 | 2/1961 | Zich et al. | 280/763 X |
| 3,648,960 | 3/1972 | Krekeler | 248/356 |
| 3,830,468 | 8/1974 | Whitchurch et al. | 248/356 X |
| 3,861,648 | 1/1975 | Glassmeyer | 280/766 X |
| 3,895,682 | 7/1975 | Graham | 280/766 X |

FOREIGN PATENT DOCUMENTS 928946  5/1955  Fed. Rep. of Germany .......... 248/356

Primary Examiner—Joseph F. Peters, Jr.
Assistant Examiner—Norman L. Stack, Jr.
Attorney, Agent, or Firm—Merchant, Gould, Smith, Edell, Welter & Schmidt

[57] ABSTRACT

An adjustable stand comprising a hollow cylindrical reservoir (11) mounted on a base (12), a hollow cylindrical piston (10) slidable in the reservoir to define therewith a chamber (16) of variable volume, a closure disk (20) at one end of the piston to divide the chamber into first and second portions, and having an aperture (23) to provide passage between the portions, a load supporting cap (13) at the other end of the piston, a charge in the chamber of particulate loose material capable of granular flow through the passage, the disk being configured to facilitate the flow in one direction and impede the flow in the other direction, an agitator (27) in the piston and cylinder and extending through the aperture for enabling load responsive flow of the material through the passage in the other direction, and a mechanical connection (34, 36) for enabling operation of the agitator from outside the chamber.

9 Claims, 7 Drawing Figures 4,284,293

1

ADJUSTABLE STAND

TECHNICAL FIELD

This invention relates to an adjustable stand, and particularly to such a stand especially adapted to be firmly secured to a vehicle such as a lowboy trailer for ready operation into a condition of use and for easy release to a condition of storage.

BACKGROUND OF THE PRIOR ART

It is known to provide a stand having a receiver, a piston, and load supporting material flowable into the receiver from the piston so that the piston may rest on the material and support at any desired height an object placed thereon, and so that by inversion of the stand the material may flow out of the reservoir into the piston to enable the piston to be withdrawn within the reservoir. Evans et al. U.S. Pat. No. 2,510,688 teaches one such arrangement.

It is a characteristic of such stands that when it is no longer desired to support an object resting thereon, the object must be raised by accessory means until the stand can be removed and then inverted to restore its initial condition of minimum dimension.

SUMMARY OF THE INVENTION

The present invention comprises a stand so constructed that it can be lowered from beneath its supported object, without requiring that the object be first raised, by use of an agitator which enables the movement of load supporting material from the reservoir into the piston even when the stand is under load, and especially under the relatively small load of the piston's own weight. The invention also includes a support cap which adapts the stand for use to support either elongated objects of limited transverse dimension, such as vehicle axles, or bodies having flat lower surfaces: it may even be permanently attached to such a flat surface and yet be rotatable into a position where it does not interfere with normal use of the body.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

In the drawing, like reference numerals indicate corresponding parts throughout the several views.

BRIEF DESCRIPTION OF THE DRAWING

Referring now to the drawing.

FIG. 3 is a fragmentary top plan of the invention;

FIGS. 4 and 5 show the stand in use supporting objects of different characteristics;

DESCRIPTION OF THE PREFERRED EMBODIMENT

Figure 1:
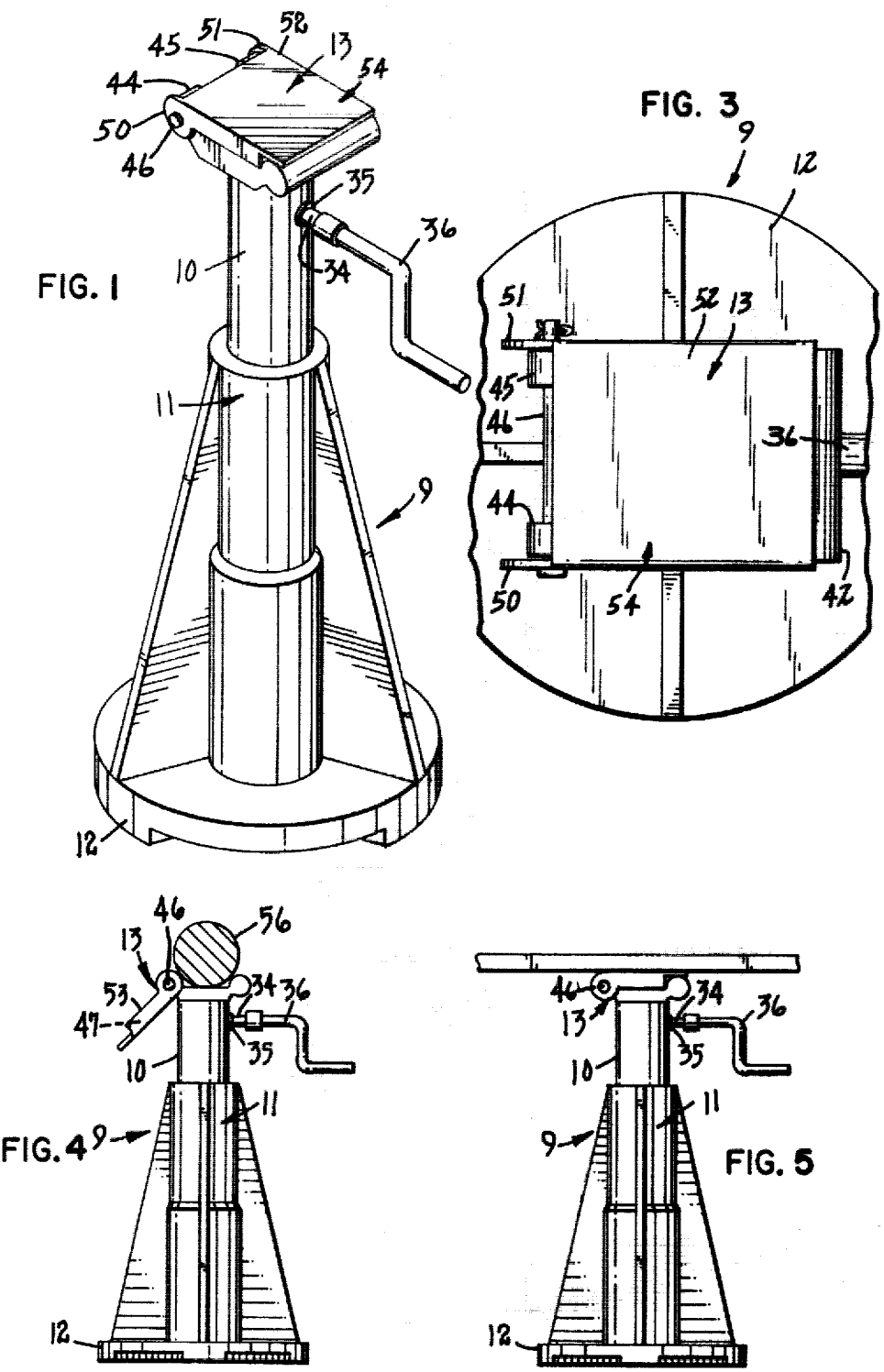
FIG. 1 is a perspective view of an adjustable stand according to the invention.
Figure 2:
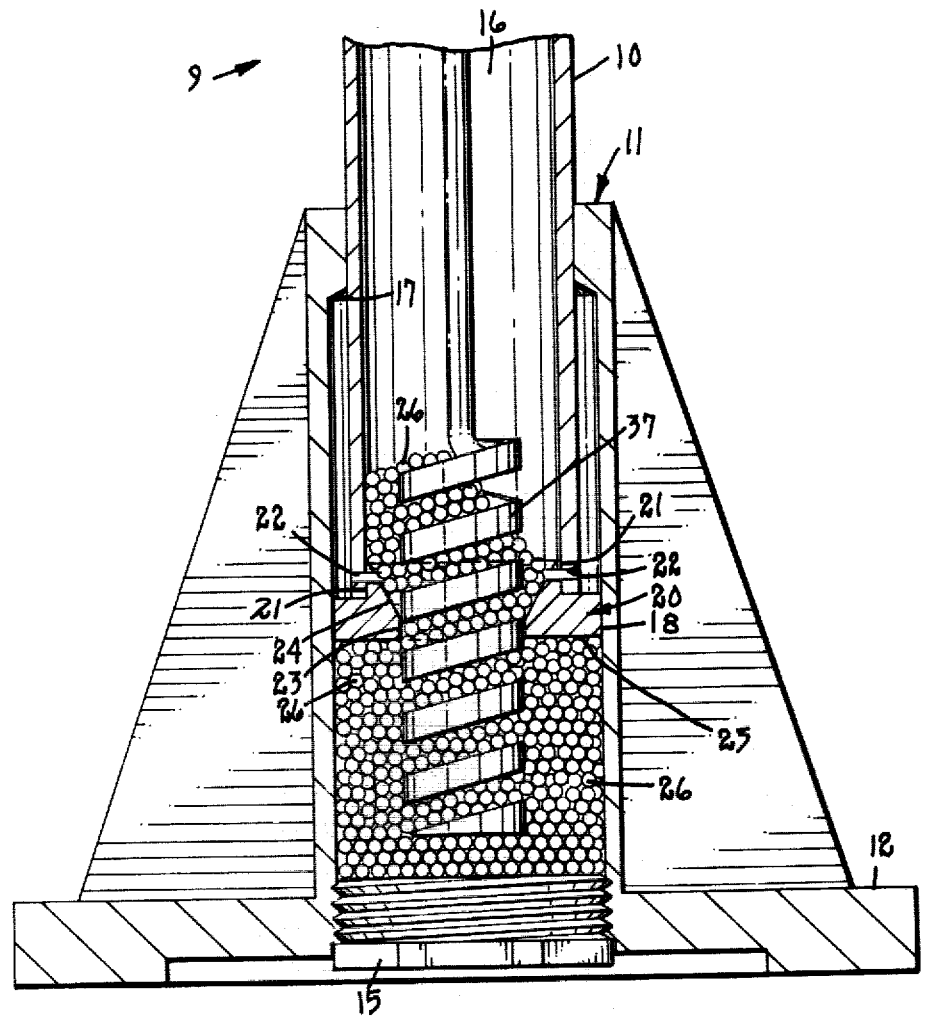
FIG. 2 is a longitudinal central section of the device of FIG. 1.

An adjustable stand 9 according to my invention is shown to comprise a piston 10 coaxially slidable in a reservoir 11: a base member 12 is secured to or unitary with the lower end of reservoir 11, and a support cap 13 is secured to the top of piston 10 as by pins 14. The bottom of reservoir 11 is removably closed by a plug 15. Piston 10 and reservoir 11 are hollow, and jointly define a chamber 16 of which the total volume varies as piston 10 slides in reservoir 11, guided in part by a shoulder 17 at the top of the reservoir, and in part by the rim 18 of a closure disk 20 having a shoulder 21 which fits into piston 10 at the end opposite cap 13 and is secured by pins 22. An aperture 23 of circular section is formed axially in disk 20 and is downwardly tapered inwardly at 24: the bottom 25 of disk 20, however, is flat.

A charge of particulate load-supporting material 26 is contained in chamber 16 above and below disk 20, for flowing through the passage afforded by aperture 23. Material 26 is preferably in the form of small metal balls of diameter much less than the minimum diameter of aperture 23.

An agitator 27 is mounted for rotation about the axis of piston 10 and aperture 23. The upper portion of agitator 27 is a shaft 30 supported in a cross member 31 in piston 10 and carrying a bevel gear 32. A second bevel gear 33 is carried on a shaft 34 passing through a bearing 35 in piston 10 for cooperating with a hand crank 36 to cause rotation of agitator 27.

The lower portion of the agitator is configured as a helix 37, the turns of which are spaced by a distance greater than the diameter of the balls of material 26. The outside diameter of helix 37 is sized for a guidance fit in aperture 23: the inside diameter of the helix is much greater than the ball diameter, so that the balls can move freely along and through the helix. As suggested in the drawing, the cross section of the material of which the helix is made may be rectangular or of some other noncircular configuration.

Cap 13 comprises a first member 40 secured to the top of piston 10 by pins 14 to close the top of the piston, and provided with a lower central portion 41 bordered on two opposite edges by raised ridges 42 and 43. Ridge 42 may be continuous: ridge 43 is interrupted to form a pair of spaced ears 44 and 45 which are bored coaxially to receive a pivot pin 46 by means of which a second member 47 is secured to member 40. Member 47 comprises a pair of ears 50 and 51 spaced and aligned to cooperate with ears 44 and 45: it has a first surface 52 which is flat and a second surface 53 adapted to engage the center portion 41 of member 40 in supported relation thereto. While member 47 is shown in the drawing to be made up of two portions 54 and 55, in practice the member may, if desired, be a single casting or forging.

As suggested in FIG. 4, when the stand is to be used to support something of limited cross-sectional dimension, such as a rod, pipe, or axle 56, member 47 is pivoted about pin 46 so that the axle is received between ridges 42 and 43 of member 40. On the other hand, to support something having a flat undersurface, member 47 is pivoted about pin 46 so that surface 53 thereof is in supported engagement with portion 41 of member 40, as shown in FIG. 5.

Operation

The operation of the stand as described above is as follows. The stand is positioned under an object to be supported, cap 13 is arranged in accordance with the nature of the object, and piston 10 is manually raised until cap 13 is in supporting relation with the object—alternatively, the piston is lifted to the desired height before the object is placed thereon. During this process, material 26 is free to flow through aperture 23 and helix 37 into the portion of chamber 16 below closure disc 20. When weight is applied at the top of piston 12, the annular surface of disk 20 in contact with the supporting material is of sufficient area to transfer the weight to the balls 26, which are not sufficiently fluent to move back upwardly through aperture 23, and the stand supports the object without time limit.

When the object has been removed it is possible to invert the stand, so that the medium can flow back through aperture 23 to permit lowering the piston as desired, as is conventional in stands of this kind. However, it is also possible with my invention to lower piston 10 without inverting the stand. This is accomplished by operating hand crank 36 to rotate agitator 27. Helix 37 rotates in the medium, agitating it so that the force vectors can cause upward movement of the medium through the aperture, the pitch of the helix acting to augment to some extent the upward ball movement. When rotation of agitator 27 is interrupted, the stand regains a stable state.

My invention thus enables some downward adjustment of the height of the object being supported without removing and inverting the stand.

Figure 7:
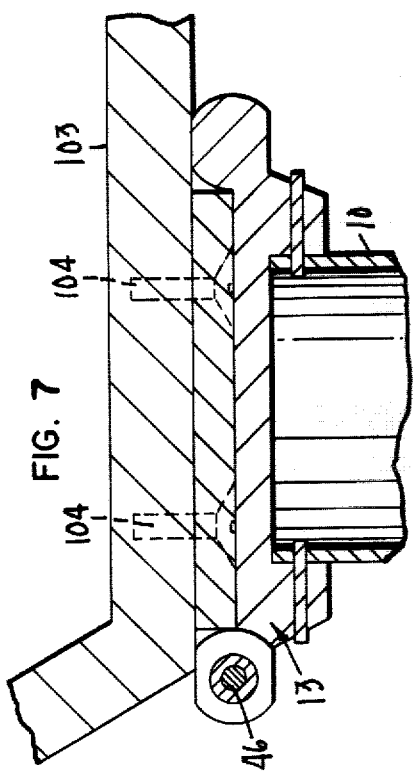
FIG. 7 is an enlarged fragmentary sectional view of the structure of FIG. 6.
Figure 6:
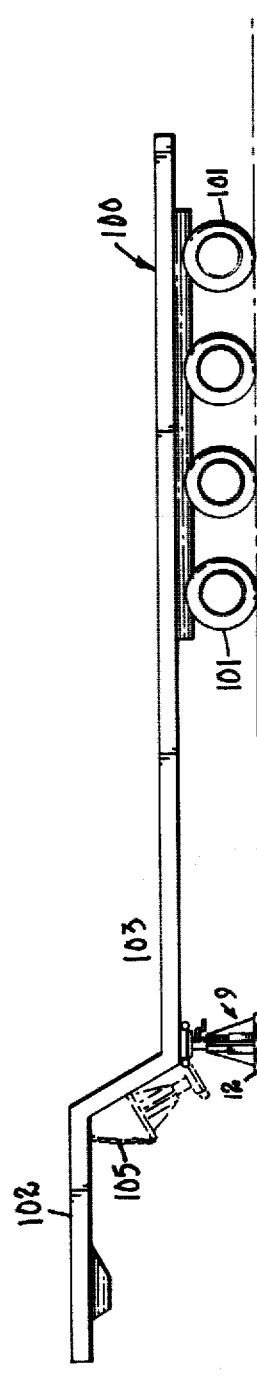
FIG. 6 shows a stand according to the invention incorporated into a lowboy trailer.

A particular application of my invention is shown in detail in FIGS. 6 and 7. Here a transport trailer 100 of the type sometimes known as a lowboy is shown to be mounted on a plurality of wheels 101 and to be provided with a gooseneck 102 for coupling it to a traction vehicle. A stand according to the invention is shown at 9: preferably two such stands are provided at opposite sides of the trailer, although in some instances a single central stand may be sufficient. Stand 9 is positioned so that member 47 of support cap 13 may be secured under the floor 103 of the trailer by suitable fasteners 104 (see FIG. 7) with pin 46 extending transversely of the vehicle.

Stand 9 is secured to the trailer at such a location that it can be pivoted about pin 46 and normally carried on the vehicle in inverted position, supported by suitable means such as a releasable chain 105, as shown in FIG. 5. When it is desired to use the stand it is released from chain 105 and pivoted into mounting position: the base and reservoir are allowed to slide downward until the base engages the ground. The load supporting material flows through helix 37 and aperture 23 into reservoir 26 to fill the latter. This may, if desired, be accompanied by a little operation of agitator 27 to facilitate the flow of material 26. The trailer is now uncoupled from the traction vehicle by raising gooseneck 102 slightly, and this allows further flow of material into reservoir 11. When the weight of the trailer is transferred to the stand or stands, it is supported by the pressure of disk surface 25 against the material, which does not flow upward through the helix and aperture under these conditions.

When it is desired to recouple the trailer, the traction vehicle is positioned under gooseneck 102 and crank 36 is operated. This agitates the material 26, enabling its upward flow through aperture 23 under the load of the trailer, and the latter settles into coupled relation with the traction vehicle. The stand may now be returned to its storage relation to chain 105.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

What is claimed is:

1. Adjustable stand apparatus in combination:
   a hollow cylindrical reservoir having an axis extending between a first, closed end and a second, open end thereof;
   a hollow cylindrical piston having a first end received in said reservoir and a second end extending axially therefrom, said piston being slidable axially in said reservoir so that said piston and said reservoir jointly define a chamber of variable volume;
   closure means for said first end of said piston, having an aperture therein to divide said chamber into first and second portions and to provide a passage between said portions;
   a charge in said chamber of particulate load supporting material capable of granular flow through said passage, said closure means being configured to facilitate the gravity-responsive flow of said material in a first direction, from said piston to said reservoir, but to inhibit load-responsive flow of said material in a second direction, from said reservoir to said piston;
   agitator means carried in said piston and extending through said aperture and operable to enable load responsive flow of said material through said passage in said second direction; and
   means for manually causing actuation of said agitator means.

2. An adjustable supporting stand comprising, in combination:
   a hollow cylindrical reservoir having an axis extending between a first, closed end and a second, open end thereof;
   a base member at said first end of said reservoir for supporting said reservoir with said axis vertical;
   a hollow cylindrical piston having a first end received in said reservoir and a second end extending axially therefrom, said piston being slidable axially in said reservoir so that said piston and said reservoir jointly define a chamber of variable volume;
   a support cap mounted on said second end of said piston;
   closure means for said first end of said piston, having an aperture therein to divide said chamber into first and second portions and to provide a passage between said portions;
   a charge in said chamber of particulate load supporting material capable of granular flow through said passage, said closure means being configured to facilitate the gravity-responsive flow of said material in a first direction, from said piston to said reservoir, but to inhibit load-responsive flow of said material in a second direction, from said reservoir to said piston;

agitator means carried in said piston and extending through said aperture and operable to enable load responsive flow of said material through said passage in said second direction; and means for manually causing actuation of said agitator means.

3. A stand according to claim 2 in which said agitator means includes a helical portion located in said passage and extending into said reservoir and rotatable about said axis;

and in which the last-named means comprises means extending through said piston for causing rotation of said agitator means.

4. A stand according to claim 2 in which said material comprises metallic balls, and in which said closure means has a first flat surface directed toward said reservoir and said aperture tapers inwardly toward said flat surface.

5. A stand according to claim 4 in which the radius of said helical portion is substantially the same as the diameter of said aperture, and said portion has an axial void of diameter several times that of said balls, and the turns of said helix are spaced by a distance greater than the diameter of said balls, to enable flow of said balls from said piston to said reservoir through said helix.

6. A stand according to claim 5 in which the material of said helical portion is of noncircular cross-section.

7. A stand according to claim 2 in which said support cap comprises a first member secured to said piston and having a flat central portion and a pair of parallel portions raised from said central portion, and a second member pivoted to said first portion having a first flat surface and a second, opposite surface configured to engage said central portion of said first member in supported relation thereto.

8. Apparatus according to claim 7 in which said second member of said support cap is secured beneath a transport vehicle with said flat surface against an undersurface thereof.

9. A stand according to claim 8 in which the pivotal connection between said portions of said cap extends transversely of said vehicle, to enable rotary displacement of said stand upward, and means movably retaining said stand in said displaced position.

* * * * *